United States Patent
Suryanarayana et al.

(10) Patent No.: US 11,249,767 B2
(45) Date of Patent: Feb. 15, 2022

(54) BOOT ASSIST ZERO OVERHEAD FLASH EXTENDED FILE SYSTEM

(71) Applicant: Dell Products L.P., Round Rock, TX (US)

(72) Inventors: Shekar Babu Suryanarayana, Bangalore (IN); Sumanth Vidyadhara, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 16/268,164

(22) Filed: Feb. 5, 2019

(65) Prior Publication Data

US 2020/0249958 A1 Aug. 6, 2020

(51) Int. Cl.
*G06F 9/4401* (2018.01)
*G06F 3/06* (2006.01)

(52) U.S. Cl.
CPC .......... *G06F 9/4406* (2013.01); *G06F 3/0604* (2013.01); *G06F 3/0659* (2013.01); *G06F 3/0673* (2013.01)

(58) Field of Classification Search
CPC ...................................................... G06F 9/44
See application file for complete search history.

(56) References Cited

U.S. PATENT DOCUMENTS

| | | | | | |
|---|---|---|---|---|---|
| 4,974,198 | A | * | 11/1990 | Ishii | G06F 15/8076 712/8 |
| 5,129,092 | A | * | 7/1992 | Wilson | G06F 9/3885 382/304 |
| 2003/0154368 | A1 | * | 8/2003 | Stevens, Jr. | G06F 9/4401 713/1 |
| 2004/0268108 | A1 | * | 12/2004 | Chen | G06F 9/4405 713/1 |
| 2007/0016763 | A1 | * | 1/2007 | Koyama | H04N 1/00928 713/1 |

* cited by examiner

*Primary Examiner* — Paul Yen
(74) *Attorney, Agent, or Firm* — Norton Rose Fulbright US LLP

(57) ABSTRACT

An information handling system may load first data from a location information area of a first memory, specifying a plurality of locations of metadata for a plurality of stages of basic input/output system (BIOS) initialization. The information handling system may then load first metadata for a first stage of BIOS initialization from a first metadata location of the plurality of locations specified by the first data. The first metadata may contain information for indexing first initialization data located at a first initialization data location. The information handling system may then index the first initialization data of the first initialization data location based, at least in part, on the first metadata. The information handling system may then perform the first stage of BIOS initialization based, at least in part, on the first initialization data.

20 Claims, 6 Drawing Sheets

BOOT ASSIST ZERO OVERHEAD FLASH EXTENDED FILE SYSTEM

FIELD OF THE DISCLOSURE

The instant disclosure relates to information handling system initialization. More specifically, portions of this disclosure relate to staged initialization of a BIOS/UEFI of an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Initialization of information handling systems is longer than desired and detracts from a user's experience with the system. One step in initializing an information handling system is initializing a basic input/output system (BIOS), which may include initialization of a unified extensible firmware interface (UEFI). Firmware for the BIOS/UEFI may be stored in a file system of a flash memory, and may be loaded to complete initialization of drivers, components, applications, and an operating system of the information handling system. The BIOS/UEFI may provide a user interface to allow a user to direct the initialization of the information handling system, such as by selecting an operating system boot device and configuring components and firmware. Flash memory, such as NOR flash memory, for storing BIOS/UEFI initialization data and other firmware may be limited by space and cost constraints of the NOR flash memory. These constraints may inhibit implementation of rich graphical environments and fonts in a BIOS/UEFI user interface. Initialization of the BIOS/UEFI may include indexing of a BIOS/UEFI memory containing information for drivers, fonts, applications and other BIOS/UEFI elements prior to loading the information and initializing the BIOS/UEFI. Indexing can be time consuming, and BIOS/UEFI initialization time may exceed forty-five seconds. Such a long delay can negatively impact a user experience.

Shortcomings mentioned here are only representative and are included simply to highlight that a need exists for improved information handling systems, particularly for BIOS/UEFI implementations. Embodiments described herein address certain shortcomings but not necessarily each and every one described here or known in the art. Furthermore, embodiments described herein may present other benefits than, and be used in other applications than, those of the shortcomings described above.

SUMMARY

A file system used in initializing a BIOS/UEFI may be divided into multiple portions to facilitate staged initialization of the BIOS/UEFI. Staged initialization of a BIOS/UEFI may substantially reduce boot time. For example, staged initialization using a divided file system may allow the information handling system to forego indexing of an entire BIOS/UEFI flash memory prior to performing initialization processes. An information handling system may index a first portion of the BIOS/UEFI file system and may begin a first stage of BIOS/UEFI initialization. While the first stage of BIOS/UEFI initialization is performed, the BIOS/UEFI may begin indexing a second portion of the BIOS/UEFI file system for performing a second stage of BIOS/UEFI initialization. Thus, with a staged initialization system, some processes may be performed in parallel. Furthermore, a divided file system may allow information for initializing a BIOS/UEFI to be spread across multiple memories of an information handling system allowing for larger firmwares that provide expanded BIOS/UEFI functionality and more graphically rich presentations of a BIOS/UEFI user interface.

An information handling system may include a divided BIOS/UEFI initialization file system to facilitate staged initialization of the BIOS/UEFI. A method for initializing an information handling system may begin with loading first information from a location information area of a first memory of the information handling system. The first memory may, for example, be a NAND or NOR flash memory of the information handling system containing at least a portion of a BIOS/UEFI initialization file system. The information handling system may be prompted to index and read information from the location information area upon commencement of a BIOS/UEFI initialization process. The first information may, for example, be information specifying a plurality of locations of metadata for a plurality of stages of BIOS/UEFI initialization. For example, initialization of the BIOS/UEFI may be divided into two or more stages and the location information area may include information for accessing a set of metadata for each of the stages. In some embodiments, each of the plurality of locations of metadata for the plurality of stages may be located in the first memory to facilitate rapid indexing and loading of metadata.

After loading the first information, the information handling system may then load first metadata for a first stage of BIOS initialization from a first metadata location specified by the first data. The first stage of BIOS initialization may include a first stage of UEFI initialization. The information handling system may index and load the first metadata from the first metadata location. The first metadata may include information for indexing first initialization data of a first initialization data location. For example, the first metadata may include information specifying a location of first initialization data for performing the first stage of initializing the BIOS. Each set of metadata specified by the first information from the first location information area may contain information for indexing initialization data for a different stage of BIOS initialization process.

The first initialization data may then be indexed based, at least in part, on the first metadata. The first initialization data may include BIOS/UEFI boot critical elements such as drivers, loaders, and other boot critical elements. The first stage of initializing the BIOS may then be performed based, at least in part, on the first initialization data. For example, the first stage of initializing the BIOS may include initializing one or more boot-critical drivers of the information handling system. Thus, the first metadata may include information for indexing first initialization data including data for one or more boot critical drivers.

Second metadata for a second stage of initializing a BIOS of an information handling system may be loaded from a second metadata location specified by the first data from the location information area. The second metadata may include information for indexing second initialization data stored at a second initialization data location. For example, the second metadata may include a location such as an address for the second initialization data location. In some embodiments, the second metadata may be loaded prior to completion of performance of the first stage of initializing the BIOS. For example, while an information handling system is performing a first stage of initializing the BIOS, it may, in parallel, begin loading second metadata and/or indexing second initialization data for performing the second stage of initializing the BIOS. Loading of metadata and/or indexing of initialization data for performing a second stage of BIOS initialization, in parallel with performance of a first stage of BIOS initialization may reduce the time required to initialize an information handling system. In some embodiments, the second initialization data location may be a partition of a second memory of the information handling system, such as a partition of an information handling system hard disk or a solid state drive (SSD) of the information handling system. For example, the second initialization data may include pre-boot graphical user interface data for the BIOS/UEFI of the information handling system, which may require a substantial amount of storage and may not easily be contained in the first memory. Storage of BIOS/UEFI initialization data across a plurality of memories of the information handling system may allow for storage of a greater amount of initialization data, without requiring an increase in size of a main BIOS initialization data memory, which may be cost prohibitive.

In some embodiments, the first metadata may be loaded to a first random access memory (RAM) of the information handling system. When the first initialization data has been indexed, the information handling system may load a second set of meta-data to the first RAM, overwriting the first set of metadata.

After loading the second metadata, the information handling system may index the second initialization data of the second initialization data location based, at least in part, on the second metadata. After the information handling system has indexed the second initialization data, it may perform the second stage of initializing the BIOS based, at least in part, on the second initialization data. The information handling system may perform similar steps with respect to additional stages for initializing the BIOS until the BIOS/UEFI has been initialized.

An information handling system may include a processor and first and second memories for performing the steps described herein. The steps described herein may also be included in a non-transitory computer readable medium of a computer program product.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
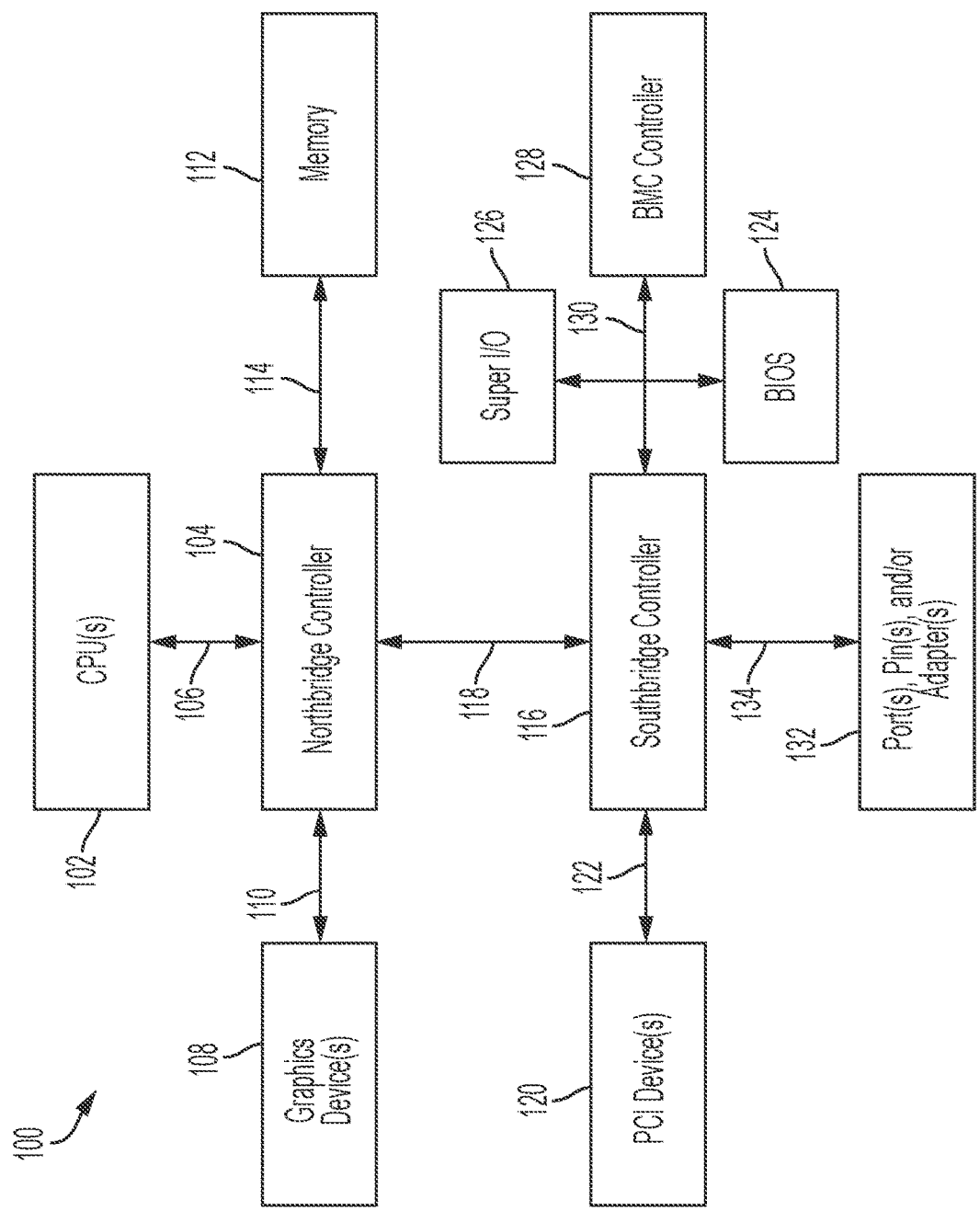
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130. Super I/O Controller 126 combines interfaces for a variety of lower bandwidth or low data rate devices. Those devices may include, for example, floppy disks, parallel ports, keyboard and mouse, temperature sensor and fan speed monitoring, etc.

BIOS 124 may include non-volatile memory having program instructions stored thereon. The instructions stored on the BIOS may be usable CPU(s) 102 to initialize and test other hardware components and/or to load an Operating System (OS) onto IHS 100, for example during a pre-boot stage. As such, BIOS 124 may include a firmware interface that allows CPU(s) 102 to load and execute certain firmware, as described in more detail below. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
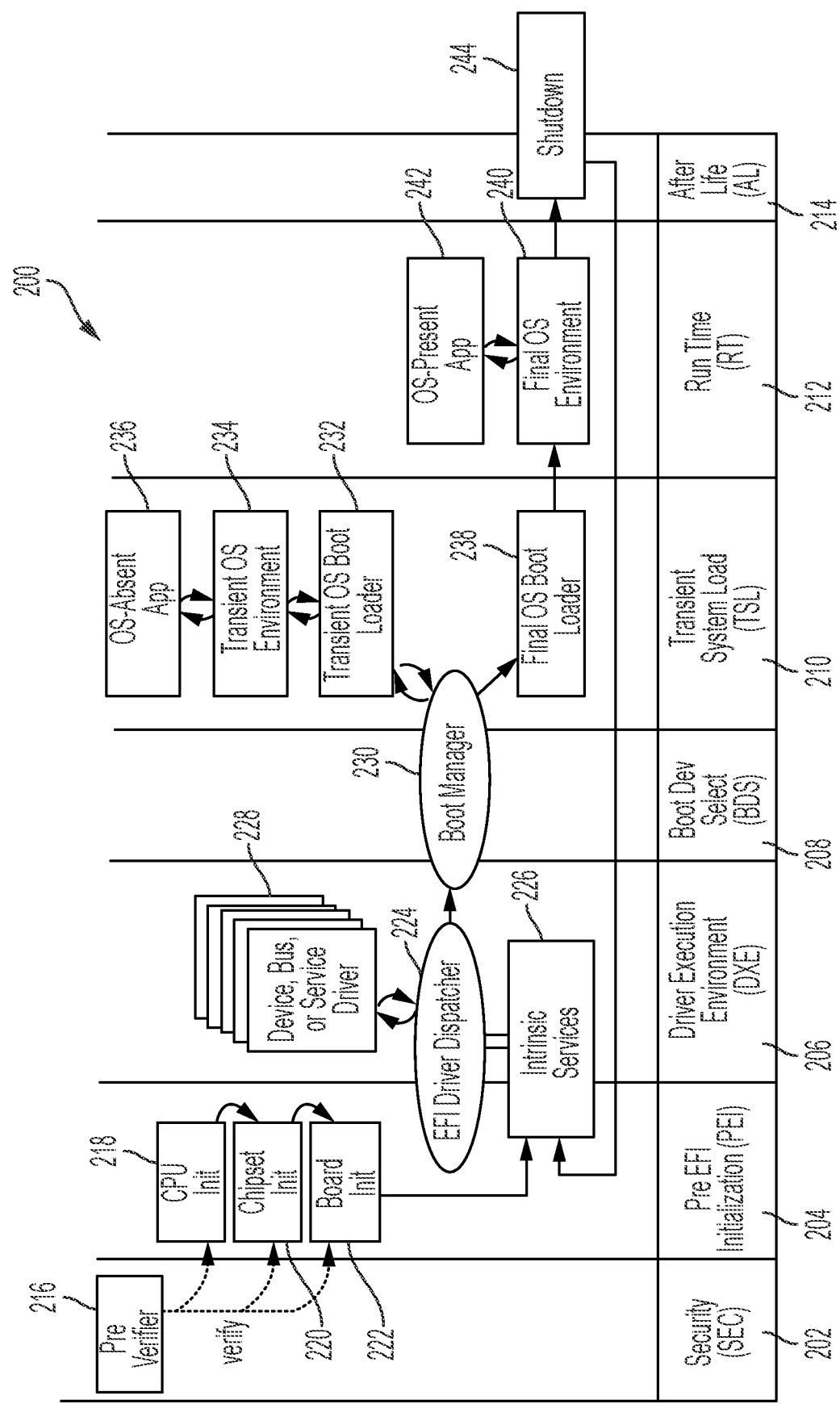
FIG. 2 is a process diagram of an example information handling system booting process according to some embodiments of the disclosure.

When an information handling system is powered up or restarted, the information handling system may enter a pre-boot stage to initialize and configure hardware and firmware, prepare the information handling system for booting of the operating system, and boot the operating system. The pre-boot stage may begin when the information handling system is powered on and may finish when the information handling system has completed booting of an operating system. An example flowchart 200 including a pre-boot stage is shown in FIG. 2. After an IHS is powered on, the IHS may enter a security phase 202 of the pre-boot stage, wherein the BIOS/UEFI may perform a pre-verify operation 216 to examine the security certificate and verify that the device is ready for secure operation. After the security phase 202, the IHS may enter a pre-extensible firmware interface initialization phase 204, wherein the IHS may initialize a CPU at block 218, initialize a chipset at block 220, and initialize a motherboard at block 222. After initializing the CPU, chipset, and motherboard, the IHS may initialize intrinsic services at block 226 and may enter a driver execution environment at block 206. The IHS may initiate an extensible firmware interface driver dispatcher 224 which may execute device, bus, and/or services drivers at block 228. The EFI driver dispatcher may then initialize a boot manager at block 230 and the IHS may enter a boot device select (BDS) phase at block 208 to select a boot device. In some embodiments, a pre-boot graphical user interface may be initialized when the information handling system exits a driver execution environment stage at block 206 and enters a boot device select stage at block 208. The information handling system may then enter a transient system load (TSL) phase at block 210 where the boot manger may initialize a transient OS boot loader at block 232, a transient OS environment at block 234, and an OS-absent application at block 236. The boot manger may initialize a final OS boot loader at block 238 to initialize final operation of the operating system. The information handling system may then enter a run time phase at block 212 where a final OS environment is presented at block 240, and an OS-present application is executed at block 242. When the information handling system enters the run time phase at block 212, the pre-boot stage may end. When an information handling system is powered down, it may enter an after life stage at block 214 and may perform a shutdown operation at block 244. In some embodiments, if an information handing system is simply restarted, it may bypass a security stage at block 202 and proceed directly to initialization of intrinsic services at block 226.

After powering up, an information handling system may begin initialization of a BIOS. For example, in some embodiments initialization of a BIOS may precede the security stage, discussed with respect to block 202 of FIG. 2. In other embodiments, initialization of the BIOS may extend through a driver execution environment stage, discussed with respect to block 206 of FIG. 2. Initialization of the BIOS/UEFI may be split into multiple stages, without requiring indexing of a full BIOS/UEFI initialization memory prior to beginning one or more initialization stages. Staged BIOS/UEFI initialization may allow the information handling system to begin a BIOS/UEFI initialization stage prior to indexing the entirety of initialization data. Staged initialization of a BIOS/UEFI of an information handling system can reduce the time required to initialize an information handling system, enhancing a user experience. For example, initialization of an information handling system, wherein all BIOS/UEFI initialization data is indexed prior to commencement of BIOS/UEFI initialization processes, may require between twelve and forty-five seconds, depending on system parameters, while a staged BIOS/UEFI initialization, as described herein, may require between six and fifteen seconds. Furthermore, a staged BIOS/UEFI initialization, as described herein, may allow extension of storage space for BIOS/UEFI initialization data across multiple memories of an information handling system, allowing for storage of graphics and applications that can provide a more rich pre-boot user experience.

Figure 3:
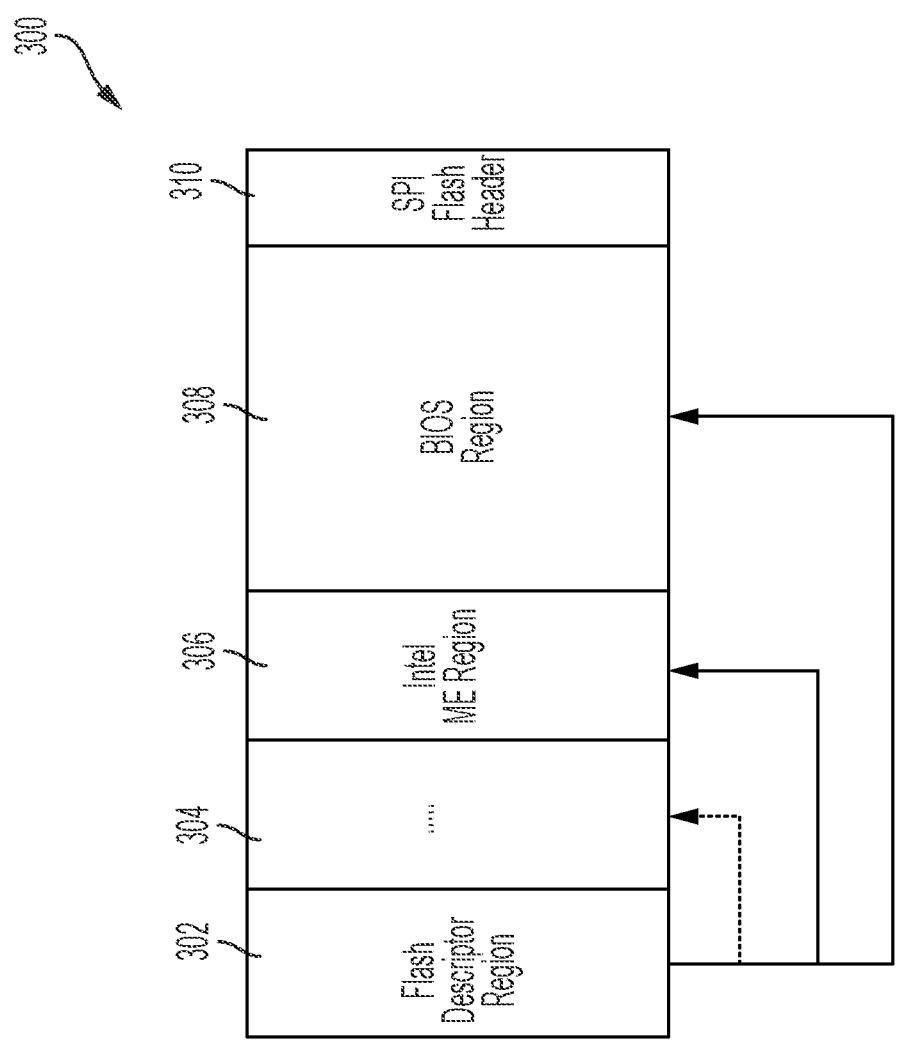
FIG. 3 is an illustration of an example file system according to the prior art.

A file system 300 of a memory including data for BIOS/UEFI initialization, according to the prior art, is shown in FIG. 3. The file system 300 may include a BIOS region or partition 308 along with other partitions containing other data. In some cases, the entire flash memory must be scanned and indexed to construct data structures prior to mounting before beginning initialization of a BIOS/UEFI. The file system 300 may include a flash descriptor region 302 including information for indexing the remaining contents of the flash memory. For example, when an information handling system begins a BIOS initialization process, it may load data, such as metadata, from the flash descriptor region 302 for indexing the rest of the memory. The information handling system may then index the remaining portions of the memory before using the indexed data to initialize the BIOS. For example, a management engine (ME) region 306 may include information for initializing and operating a processor of the information handling system. The BIOS region 308 may include information for initializing a BIOS/UEFI of the information handling system. For example, the information handling system may index all BIOS/UEFI initialization data from the BIOS region 308 before initializing the BIOS. The serial peripheral interface (SPI) flash header region 310 of the file system may include information governing interaction of the memory of the information handling system with other components of the information handling system. Other regions 304 may include other data used in initialization of an information handling system. Thus, an information handling system may index all BIOS/UEFI initialization data stored in a memory of an information handling system prior to performing a step of initializing the BIOS/UEFI using the indexed initialization data. Such a process can require a significant amount of time, depending on the parameters of the information handling system. For example, with a flash memory size of sixteen megabytes, initialization of a BIOS/UEFI may require between twelve and sixteen seconds. With a flash memory size of thirty-two megabytes, initialization of a BIOS/UEFI may require from eighteen to twenty-four seconds. Thus, single-staged initialization of a BIOS/UEFI where a memory with information for BIOS/UEFI initialization is indexed prior to beginning an initialization process of the BIOS/UEFI may contribute substantially to an initialization time of an information handling system.

In some instances, an additional dedicated auxiliary flash memory unit may be used to provide a small amount of additional space. For example, a storage space for information handling system components may be extended across multiple flash memories using flash map offsets in boot configuration records of a BIOS firmware. The flash map offsets may include a header defining a layout of stored information. However, flash map offsets are often incapable of accommodating changing requirements of BIOS firmware images to support chipset variations and addition and/or removal of firmware components and may not allow extension of storage into system memory, such as a hard disk or SSD of the information handling system. Further, the use of a dedicated auxiliary flash memory may further increase a BIOS initialization time. With a flash memory size of sixteen megabytes and an auxiliary flash memory size of sixteen megabytes, initialization of a BIOS/UEFI may require from twenty-five to thirty seconds. With a flash memory size of thirty-two megabytes and an auxiliary flash memory size of thirty-two megabytes, initialization of a BIOS/UEFI may require from thirty-five to forty seconds.

A staged initialization process, where BIOS/UEFI initialization information is indexed progressively as the information handling system moves through a plurality of initialization stages may substantially reduce the time required for information handling system initialization. In the staged initialization of a BIOS/UEFI, an entire flash memory containing BIOS/UEFI metadata and initialization data may not be constructed at any one time, but may progressively be constructed, loaded, and indexed as the information handling system moves through the initialization stages. Furthermore, metadata may be loaded into a RAM of the information handling system in stages, so that the entirety of the metadata for information handling system initialization data is not loaded in RAM at any one time.

Figure 4:
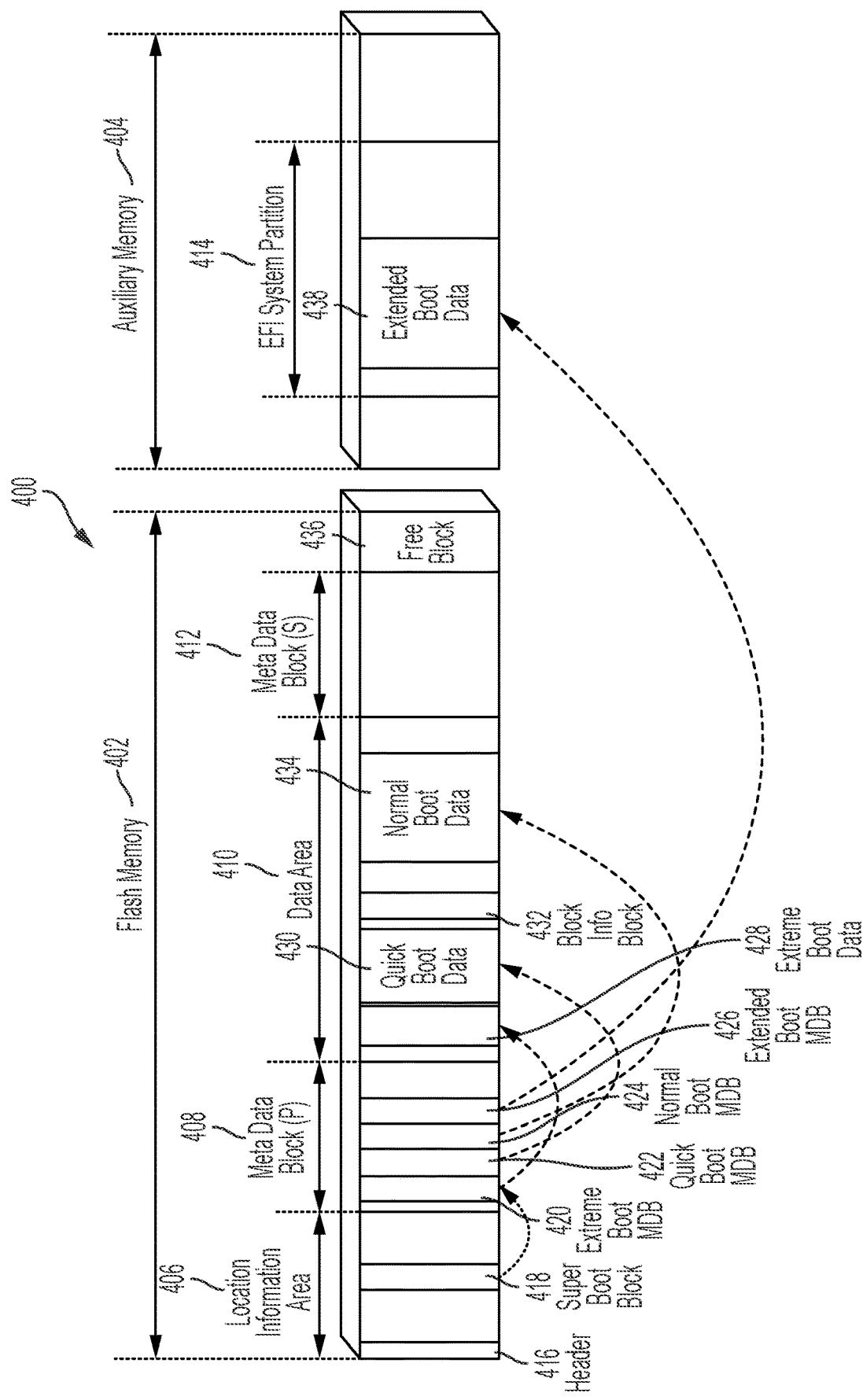
FIG. 4 is an illustration of an example divided file system for a plurality of BIOS/UEFI initialization stages according to some embodiments of the disclosure.

An example file system 400 for an information handling system is shown in FIG. 4. A first memory 402 may, for example, be a flash memory, such as a NOR or NAND flash memory, of the information handling system. The first memory 402 may include a location information area 406 for storing information related to the location of various types of information stored in the first memory 402. For example, the location information area 406 may include a header containing information about the memory 402. The location information area 406 may also include a super boot block 418 containing information about metadata stored in the file system 400. For example, the super boot block 418 may be a root direction block and may include information specifying a plurality of locations of a plurality of sets of metadata for a plurality of stages of BIOS/UEFI initialization. In some embodiments, the super boot block 418 may be part of a flash header, and a globally unique identifier (GUID) may be used to locate the super boot block 418 from a boot service. The super boot block may include information mapping the plurality of stages of BIOS/UEFI initialization and for intelligently locating the appropriate metadata block for the stage the information handling system is currently at. The super boot block 418 may include data pointing to a location at the beginning of a metadata block 408 containing a plurality of sets of metadata for a plurality of stages of BIOS/UEFI initialization. For example, the super boot block 418 may dynamically determine, construct, and load metadata required for each BIOS/UEFI initialization stage. The metadata block 408 may, for example be a primary metadata block. As the information handling system moves through the BIOS/UEFI initialization process, it may simply pick up where it left off in the metadata block 408 as it completes each initialization stage and begins a new stage. In some embodiments, the super boot block 418 may include data pointing to locations at the beginning of each set of metadata for each of the stages of BIOS/UEFI initialization stored in the metadata block 408.

The super boot block 418 may include data pointing to the beginning of an extreme boot metadata block 420 for an extreme boot stage of BIOS/UEFI initialization. The extreme boot metadata block 420 may include information for indexing extreme boot initialization data 428 for an extreme boot stage of a BIOS/UEFI initialization process. For example, the extreme boot metadata block 420 may include information specifying a location of extreme boot initialization data 428 in a data area 410 of the memory 402. The extreme boot initialization data 428 may include boot critical files and drivers. For example, the extreme boot initialization data 428 may include BIOS/UEFI configuration files, registry entries, one or more driver execution environment (DXE) drivers, and one or more boot critical drivers.

The super boot block 418 may also include data pointing to the beginning of a quick boot metadata block 422 for a quick boot stage of BIOS/UEFI initialization. Alternatively or additionally, the quick boot metadata block 422 may be located immediately adjacent to the extreme boot metadata block 420 within the metadata block 408 of the memory 402, so that the information handling system can load the quick boot metadata block 422 without consulting information stored in the super boot block 418. The quick boot metadata block 422 may include information for indexing quick boot initialization data 430 for a quick boot stage of a BIOS/UEFI initialization process. For example, the quick boot metadata block 422 may include information specifying a location of quick boot initialization data 430 in a data area 410 of the memory 402. The quick boot initialization data 430 may include boot critical drivers not included in the extreme boot initialization data 428 and other drivers and loaders.

The super boot block 418 may also include data pointing to the beginning of a normal boot metadata block 424 for a normal boot stage of BIOS/UEFI initialization. Alternatively or additionally, the normal boot metadata block 424 may be located immediately adjacent to the quick boot metadata block 422 within the metadata block 408 of the memory 402, so that the information handling system can load the normal boot metadata block 424 without consulting information stored in the super boot block 418. The normal boot metadata block 422 may include information for indexing normal boot initialization data 434 for a normal boot stage of a BIOS/UEFI initialization process. For example, the normal boot metadata block 422 may include information specifying a location of normal boot initialization data 434 in a data area 410 of the memory 402. The normal boot initialization data 434 may include applications, libraries, fonts, icons, and drivers for a BIOS/UEFI. In some embodiments, the first memory 402 may include a secondary metadata block 412 including a backup of metadata stored in primary metadata block 408, to be accessed if the primary metadata block 408 is corrupted. The first memory 402 may also include a free block 436, open for storage of additional information and a block info block 432 containing information about the data storage area 410.

The super boot block 418 may also include data pointing to the beginning of an extended boot metadata block 426 for an extended boot stage of BIOS/UEFI initialization. Alternatively or additionally, the extended boot metadata block 426 may be located immediately adjacent to the normal boot metadata block 424 within the metadata block 408 of the memory 402, so that the information handling system can load the extended boot metadata block 426 without consulting information stored in the super boot block 418. In some embodiments, boot initialization data for one or more stages may be stored in a second memory 404 of the information handling system, such as on a hard disk or solid state drive of the system. For example, the extended boot metadata block 426 may include information for indexing extended boot initialization data 438, which, in some embodiments, may be stored in an auxiliary memory 404 of the information handling system. In some embodiments, other initialization data may also be stored in the auxiliary memory 404. The auxiliary memory 404 may be a hard disk, a solid state drive, or other memory of the information handling system and may be slower than the first memory 402. Initialization data may be stored in a partition of the auxiliary memory 404, such as an extensible firmware interface (EFI) partition 414. In some embodiments, metadata may be stored in the first memory 402, such as a flash memory for rapid loading, while some initialization data may be stored in the auxiliary memory 404. Storage of all metadata in the first memory 402 may reduce overhead, for example increased metadata loading time, as compared to a system where metadata is stored on a first memory and an auxiliary memory. In some embodiments, metadata loading overhead may be reduced to as low as zero, compared to systems where all metadata and initialization data are stored on the same memory. The extended boot metadata block 426 may, for example, include information specifying a location of extended boot initialization data 438 in a partition 414 of the auxiliary memory 404. Extended boot initialization data 438 may include applications, fonts, icons, and drivers not included in normal boot initialization data 434. Thus, BIOS/UEFI initialization metadata and initialization data may be divided into a plurality of sets of metadata and initialization data for a plurality of BIOS/UEFI initialization stages.

Figure 5:
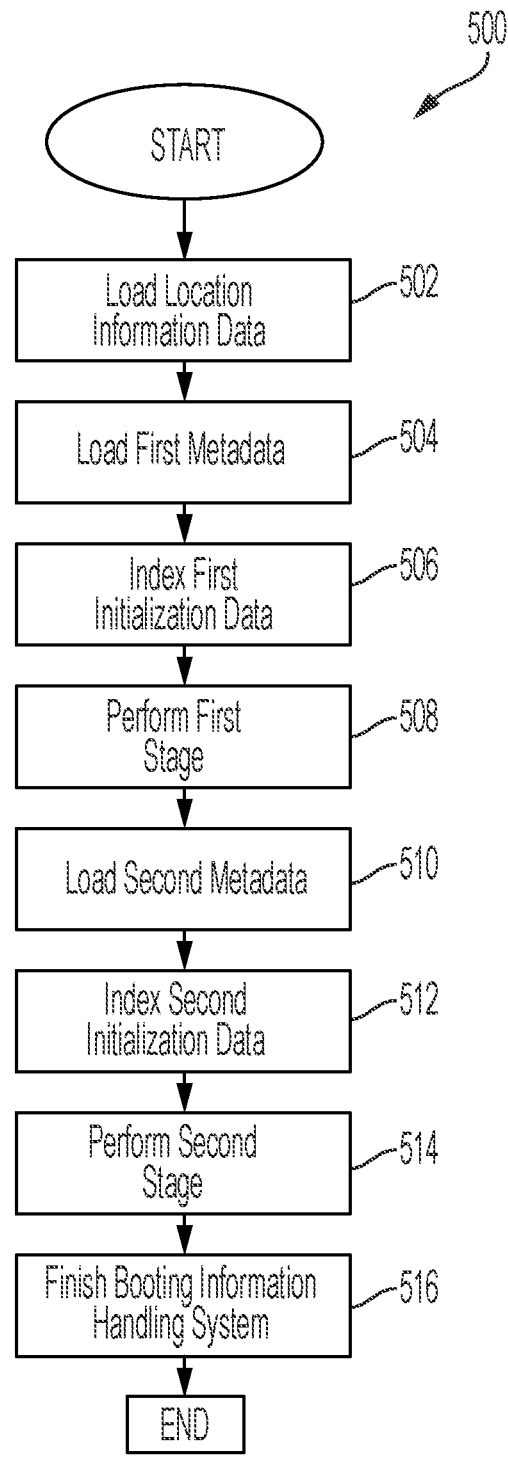
FIG. 5 is a flow chart of an example method for a multi-stage BIOS initialization process according to some embodiments of the disclosure.

A BIOS/UEFI of an information handling system may be initialized in a plurality of stages. A method 500 for staged initialization of a BIOS/UEFI is shown in FIG. 5. The method 500 may begin, at step 502, with loading location information data. For example, an information handling system may load location information data, such as a super boot block, from a location information area of a memory of the information handling system. The location information data may include information for accessing a plurality of sets of metadata for a plurality of stages of BIOS/UEFI initialization. For example, the location information data may include memory locations for accessing extreme boot metadata, quick boot metadata, normal boot metadata, and extended boot metadata for extreme boot, quick boot, normal boot, and extended boot stages of BIOS/UEFI initialization.

After the location information data has been loaded, first metadata may be loaded, at step 504. For example, the information handling system may read a first location for first metadata, such as extreme boot metadata, from the location information data and may load the first metadata based on the location information data. In some embodiments, the first metadata may be loaded to a random access memory (RAM) of the information handling system. The first metadata may be extreme boot metadata and may include information for indexing extreme boot initialization data. For example, the extreme boot metadata may include one or more memory addresses for one or more extreme boot initialization objects, such as boot critical drivers.

After the first metadata has been loaded, the first initialization data may be indexed, at step 506. Initialization data, such as the first initialization data, may include BIOS/UEFI firmware data for initialization of a BIOS/UEFI. The first initialization data may be indexed based, at least in part, on the first metadata. After the first metadata is indexed, a first BIOS/UEFI initialization stage may be performed at step 508. For example, the information handling system may initialize and execute one or more drivers and processes to begin initialization of a BIOS/UEFI based, at least in part, on the first initialization data. For example, extreme boot stage processes may be executed based, at least in part, on extreme boot initialization data.

In some embodiments, multiple sets of metadata may point to multiple different portions of first initialization data for a first stage. Such a configuration may allow multiple portions of the first initialization data to be indexed in parallel to reduce the time required for indexing and loading the first initialization data.

At step 510, second metadata may be loaded. In some embodiments, the information handling system may overwrite first metadata that was loaded and stored in RAM at step 504 with the second metadata. In some embodiments, the second metadata may be loaded, at step 510, after the first initialization data has been indexed, at step 506, but before the first BIOS/UEFI initialization stage has been completed, at step 508. Thus, the information handling system may begin loading metadata for a second initialization stage in parallel with performance of the first initialization stage. For example, the information handling system may read a second metadata location for second metadata, such as quick boot metadata, from the location information data and may load the second metadata based on the location information data. The second metadata may be quick boot metadata and may include information for indexing quick boot initialization data. For example, the quick boot metadata may include one or more memory addresses for one or more extreme boot initialization objects, such as boot critical drivers, not included in extreme boot data.

After the second metadata has been loaded, the second initialization data may be indexed, at step 512. The second initialization data may be indexed based, at least in part, on the second metadata. For example, data for a plurality of quick boot items, such as quick boot drivers, icons, loaders, and other elements may be indexed based on the second metadata. After the second metadata is indexed, a second BIOS/UEFI initialization stage may be performed at step 514. The second initialization stage may be performed after completing both the first initialization stage, at step 508, and indexing of the second initialization data, at step 512. For example, the information handling system may initialize and execute one or more drivers and processes to continue initialization of a BIOS/UEFI based, at least in part, on the second initialization data. For example, quick boot stage processes may be executed based, at least in part, on quick boot initialization data. Metadata and initialization data for further stages of a booting process, such a normal boot stage and an extended boot stage, may be similarly loaded and indexed according to the steps described above. Steps of loading metadata and indexing data may also be executed in parallel with steps of executing prior BIOS/UEFI initialization stages, as described with respect to step 510. After the BIOS/UEFI has been initialized, the information handing system may perform additional information handling system initialization steps, as described with respect to FIG. 2, until, at step 516, the information handling system may finish booting. For example, booting of an operating system of the information handling system may be complete, and the information handling system may provide full functionality to a user.

Figure 6:
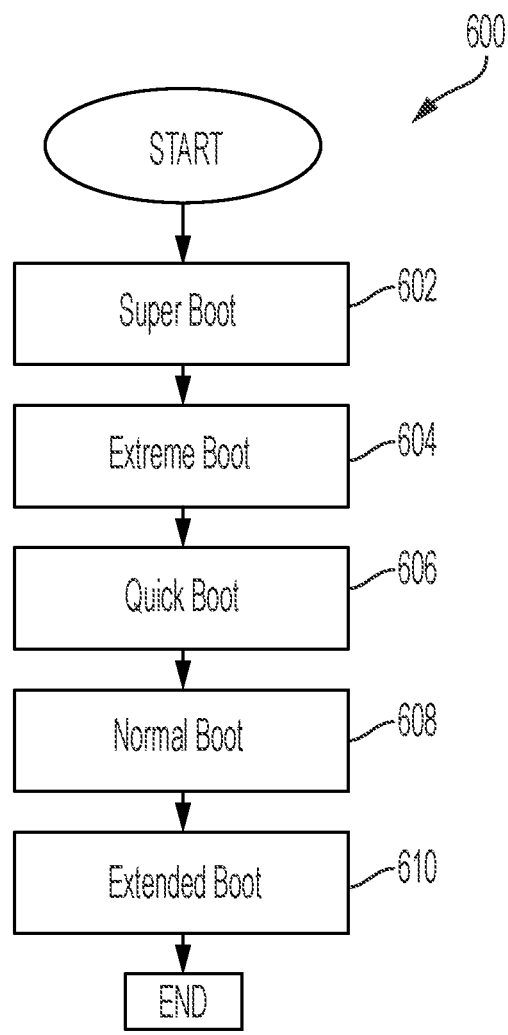
FIG. 6 is a flow chart of an example method for a plurality of stages of a BIOS initialization process according to some embodiments of the disclosure.

Initialization of a BIOS/UEFI of an information handling system may be divided into a plurality of stages. An example method 600 of executing a plurality of stages of booting an information handling system is shown in FIG. 6. The method 600 may begin at step 602 with loading of a super boot block. The information handling system may load a super boot block from a location information area of the information handling system. The super boot block may include information regarding a plurality of sets of metadata for a plurality of stages of initializing the BIOS/UEFI.

At step 604, the information handling system may perform an extreme boot stage. For example, the information handling system may load extreme boot metadata based, at least in part, on the super boot block. The information handling system may then index extreme boot initialization data based, at least in part, on the extreme boot metadata and may perform the extreme boot initialization stage based on the indexed extreme boot initialization data. Extreme boot metadata may include metadata for indexing extreme boot initialization data including BIOS configuration files, registry entries, one or more driver execution environment (DXE) drivers, and one or more boot critical drivers. The extreme boot data may exclude data that is not boot critical, to speed completion of the extreme boot stage. In some embodiments, the extreme boot stage may be shorter than the quick, normal, and extended boot stages.

At step 606, the information handling system may perform a quick boot stage. For example, the information handling system may load quick boot metadata based, at least in part, on the super boot block. The information handling system may then index quick boot initialization data based, at least in part, on the quick boot metadata and may perform the quick boot initialization stage based, at least in part, on the indexed quick boot initialization data. In some embodiments, the information handling system may load quick boot metadata and index quick boot initialization data while performing the extreme boot stage at step 604. Thus, the information handling system may prepare for the quick boot stage at step 606 in parallel with performing the extreme boot stage at step 604. Quick boot metadata may include metadata for indexing quick boot initialization data such as boot critical drivers and loaders that are not included in extreme boot initialization data. In some embodiments, the quick boot stage may be shorter than the normal and extended boot stages, but longer than the extreme boot stage.

At step 608, the information handling system may perform a normal boot stage. For example, the information handling system may load normal boot metadata based, at least in part, on the super boot block. The information handling system may then index normal boot initialization data based, at least in part, on the normal boot metadata and may perform the normal boot initialization stage based, at least in part, on the indexed normal boot initialization data. In some embodiments, the information handling system may load normal boot metadata and index normal boot initialization data while performing the quick boot stage at step 606. Thus, the information handling system may prepare for the normal boot stage at step 608 in parallel with performing the quick boot stage at step 606. Normal boot metadata may include metadata for indexing normal boot initialization data such as drivers, fonts, applications, libraries, and icons that are not included in extreme or quick boot initialization data. In some embodiments, the normal boot stage may be shorter than the extended boot stage, but longer than the extreme and quick boot stages.

At step 610, the information handling system may perform an extended boot stage. For example, the information handling system may load extended boot metadata based, at least in part, on the super boot block. The information handling system may then index extended boot initialization data based, at least in part, on the extended boot metadata and may perform the extended boot initialization stage based, at least in part, on the indexed extended boot initialization data. The extended boot initialization data may, for example, be stored in a partition of a system memory, such as a hard drive or solid state drive, separate from the memory on which the extreme, quick, normal, and extended boot metadata and the extreme, quick, and normal initialization data are stored. In some embodiments, the information handling system may load extended boot metadata and index extended boot initialization data while performing the normal boot stage at step 608. Thus, the information handling system may prepare for the extended boot stage at step 610 in parallel with performing the normal boot stage at step 608. Extended boot metadata may include metadata for indexing extended boot initialization data such as drivers, fonts, applications, libraries, and icons that are not included in extreme, quick, or normal boot initialization data. In some embodiments, the extended boot stage may be the most lengthy boot stage, longer than the extreme, quick, and normal boot stages. After performing the extended boot stage, the information handling system may finish the BIOS/UEFI initialization process. In some embodiments, other stages of BIOS/UEFI initialization may be performed before or after the extended boot stage.

The division of BIOS/UEFI initialization into a plurality of stages may reduce the time required to initialize a BIOS/UEFI and thus the time required to initialize an information handling system. For example, an information handling system with a flash memory sized at sixteen or thirty-two megabytes for storing BIOS/UEFI initialization data may complete BIOS/UEFI initialization in less than six to eight seconds. An information handling system with a flash memory sized at sixteen or thirty-two megabytes and an extended memory sized at sixteen or thirty-two megabytes for storing BIOS/UEFI initialization data may complete BIOS/UEFI initialization in less than twelve to fifteen seconds. Thus, compared to a single-stage BIOS/UEFI initialization process where all BIOS/UEFI initialization data is indexed prior to beginning initialization of a BIOS/UEFI, a BIOS/UEFI initialization time may be reduced substantially.

The schematic flow chart diagrams of FIGS. 5-6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

As used herein, when two or more elements are referred to as "coupled" to one another, such term indicates that such two or more elements are in electronic communication or mechanical communication, as applicable, whether connected indirectly or directly, with or without intervening elements.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for initializing an information handling system, comprising:
   loading first data from a location information area of a first memory of the information handling system, wherein the first data specifies a plurality of locations of metadata for a plurality of stages of basic input/output system (BIOS) initialization;
   loading first metadata for a first stage of the plurality of stages of BIOS initialization from a first metadata location of the plurality of locations specified by the first data, wherein the first metadata contains information for indexing first initialization data located at a first initialization data location;
   indexing the first initialization data located at the first initialization data location based, at least in part, on the first metadata;
   performing the first stage of BIOS initialization based, at least in part, on the first initialization data;
   after beginning performing the first stage of BIOS initialization and before completing performing the first stage of BIOS initialization, loading second metadata for a second stage of the plurality of stages of BIOS initialization from a second metadata location of the plurality of locations specified by the first data, wherein the second metadata contains information for indexing second initialization data located at a second initialization data location; and
   after loading the second metadata and before completing performing the first stage of BIOS initialization, indexing the second initialization data located at the second initialization data location based, at least in part, on the second metadata.

2. The method of claim 1, further comprising:
   performing the second stage of BIOS initialization based, at least in part, on the second initialization data.

3. The method of claim 1, wherein loading the first metadata comprises loading the first metadata to a random access memory (RAM) of the information handling system and wherein loading the second metadata comprises overwriting the first metadata with the second metadata in the RAM.

4. The method of claim 1, wherein the second initialization data location is a portion of a second memory, different from the first memory, of the information handling system.

5. The method of claim 4, wherein the second initialization data includes pre-boot graphical user interface data.

6. The method of claim 1, wherein the first metadata includes indexing data for one or more boot critical drivers.

7. The method of claim 1, wherein the first metadata includes indexing data for one or more boot critical drivers.

8. The method of claim 1, wherein the second metadata comprises one or more memory addresses for one or more boot critical drivers not included in the first initialization data.

9. An information handling system comprising:
   a processor; and
   a first memory, comprising:
      a location information area;
      a metadata area; and
      an initialization data area,
   wherein the processor is configured to perform steps comprising:
      loading first data from the location information area, wherein the first data specifies a plurality of locations of metadata, within the metadata area, for a plurality of stages of basic input/output system (BIOS) initialization;
      loading first metadata for a first stage of the plurality of stages BIOS initialization from a first metadata location of the plurality of locations of the metadata area specified by the first data, wherein the first metadata contains information for indexing first initialization data located at a first initialization data location of the initialization data area;
      indexing the first initialization data located at the first initialization data location based, at least in part, on the first metadata;
      performing the first stage of BIOS initialization based, at least in part, on the first initialization data;
      after beginning performing the first stage of BIOS initialization and before completing performing the first stage of BIOS initialization, loading second metadata for a second stage of the plurality of stages of BIOS initialization from a second metadata location of the plurality of locations specified by the first data, wherein the second metadata contains information for indexing second initialization data located at a second initialization data location, and
      after loading the second metadata and before completing performing the first stage of BIOS initialization, indexing the second initialization data located at the second initialization data location based, at least in part, on the second metadata.

10. The information handling system of claim 9, wherein the processor is further configured to perform steps comprising:
    performing the second stage BIOS initialization based, at least in part, on the second initialization data.

11. The information handling system of claim 9, further comprising:
    a random access memory (RAM),
    wherein loading the first metadata comprises loading the first metadata to the random access memory (RAM), and
    wherein loading the second metadata comprises overwriting the first metadata with the second metadata in the RAM.

12. The information handling system of claim 9, further comprising:
    a second memory, different from the first memory, wherein the location of the second initialization data is a portion of the second memory.

13. The information handling system of claim 12, wherein the second initialization data includes pre-boot graphical user interface data.

14. The information handling system of claim 9, wherein the first metadata includes indexing data for one or more boot critical drivers.

15. The information handling system of claim 9, wherein the second metadata comprises one or more memory addresses for one or more boot critical drivers not included in the first initialization data.

16. A computer program product, comprising:
a non-transitory computer readable medium comprising instructions to perform steps comprising:
loading first data from a location information area of a first memory of an information handling system, wherein the first data specifies a plurality of locations of metadata for a plurality of stages of basic input/output system (BIOS) initialization;
loading first metadata for a first stage of the plurality of stages of BIOS initialization from a first metadata location of the plurality of locations specified by the first data, wherein the first metadata contains information for indexing first initialization data located at a first initialization data location;
indexing the first initialization data located at the first initialization data location based, at least in part, on the first metadata;
performing the first stage of BIOS initialization based, at least in part, on the first initialization data;
after beginning performing the first stage of BIOS initialization and before completing performing the first stage of BIOS initialization is complete, loading second metadata for a second stage of the plurality of stages of BIOS initialization from a second metadata location of the plurality of locations specified by the first data, wherein the second metadata contains information for indexing second initialization data located at a second initialization data location; and
after loading the second metadata and before completing performing the first stage of BIOS initialization, indexing the second initialization data located at the second initialization data location based, at least in part, on the second metadata.

17. The computer program product of claim 16, wherein the non-transitory computer readable medium comprising instructions to perform steps further comprising:
performing the second stage of BIOS initialization based, at least in part, on the second initialization data.

18. The computer program product of claim 16, wherein loading the first metadata comprises loading the first metadata to a random access memory (RAM) of the information handling system and wherein loading the second metadata comprises overwriting the first metadata with the second metadata in the RAM.

19. The computer program product of claim 16, wherein the second initialization data location is a portion of a second memory, different from the first memory, of the information handling system.

20. The computer program product of claim 17, wherein the second metadata comprises one or more memory addresses for one or more boot critical drivers not included in the first initialization data.

\* \* \* \* \*